Figure 1:
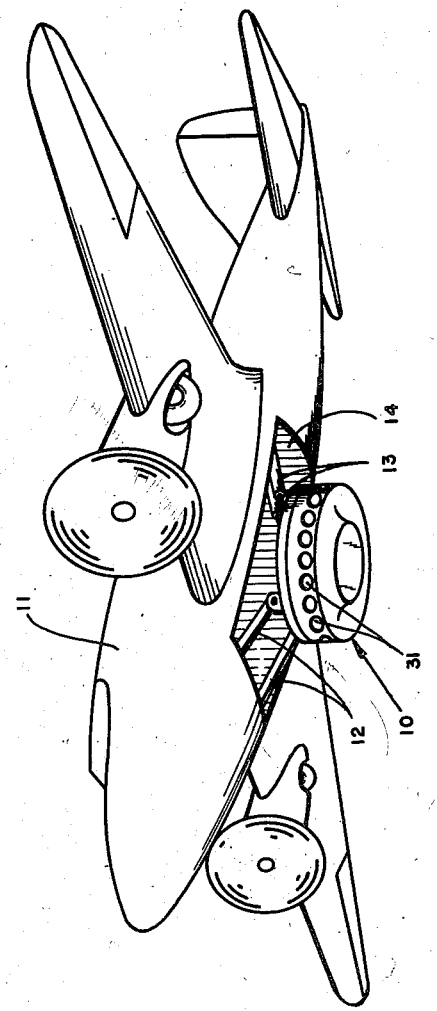

Jan. 21, 1958 T. F. DURKIN 2,820,397
AIRBORNE MISSILE DIPENSER
Filed Dec. 15, 1953 2 Sheets-Sheet 1

INVENTOR.
THOMAS F. DURKIN
BY
ATTORNEYS

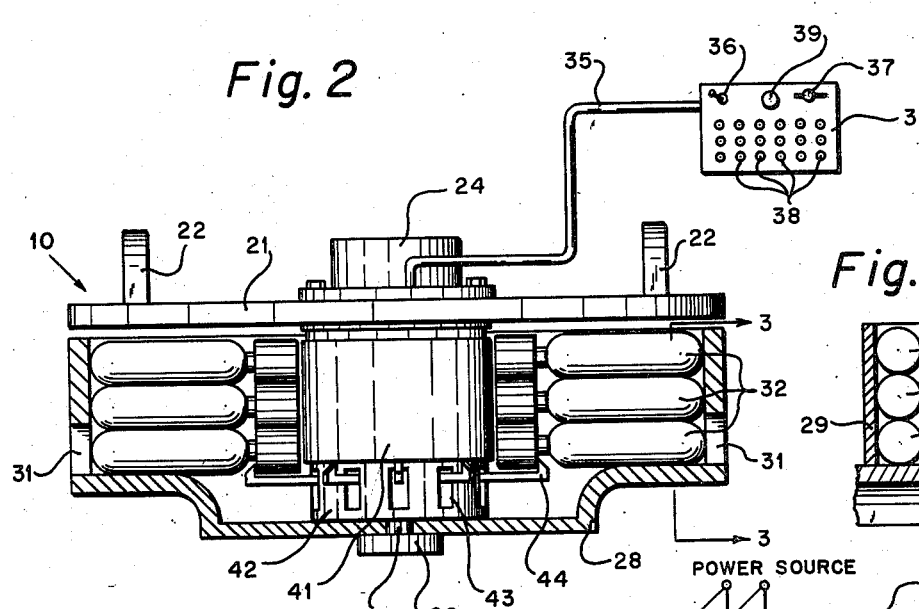

ported by suitable link members 12 and actuating means 13 for movement between a stowed position within the bomb bay 14 and an extended operating position beneath the aircraft 11.

United States Patent Office 2,820,397
Patented Jan. 21, 1958

2,820,397

AIRBORNE MISSILE DISPENSER

Thomas F. Durkin, Roslyn, Pa.

Application December 15, 1953, Serial No. 398,447

4 Claims. (Cl. 89—1.5)

(Granted under Title 35, U. S. Code (1952), sec. 266)

The invention described herein may be manufactured and used by or for the Government of the United States of America for governmental purposes without the payment of any royalties thereon or therefor.

This invention relates to a missile dispenser for aircraft and more particularly to a means for distributing a large plurality of missiles along a relatively broad path beneath the line of flight of an aircraft.

In the past, the distribution of a large plurality of bombs or missiles over a relatively wide area required the employment of a relatively large number of individual aircraft or necessitated repeated flights over the target area by a single aircraft. Neither of these alternatives proved desirable in the case of target areas which were heavily defended, because it entailed the risk of loss of a high percentage of a large number of aircraft or greatly increased the hazard incurred by a single aircraft in making repeated passes over the target.

The present invention contemplates the use of an airborne centrifugal dispenser including a rotatable missile container by means of which a single aircraft can distribute a large number of missiles over a relatively wide target area during a single pass over the target.

The object of the present invention is the provision of means for more effectively distributing a large plurality of missiles released from a single aircraft.

Another object is to provide a retractable airborne missile dispenser mechanism normally carried within an aircraft and extended below an aircraft when missiles are to be released from the missile dispenser mechanism.

A final object is the provision of a rotatable airborne missile dispenser mechanism effective to scatter a large plurality of missiles over a wide area by means of centrifugal force.

Other objects and many of the attendant advantages of this invention will be readily appreciated as the same becomes better understood by reference to the following detailed description when considered in connection with the accompanying drawings, wherein:

Fig. 1 is a perspective assembly view showing a preferred embodiment of the instant invention disposed in operative position beneath an aircraft into which it is retractable, Fig. 2 is a side elevation partly in section of a preferred embodiment of the instant invention, Fig. 3 is a partial section taken on line 3—3 of Fig. 2, Fig. 4 is a diagrammatic representation of a preferred embodiment of the control system for selectively actuating the plurality of missile retaining latch mechanisms incorporated within the missile dispenser mechanism, and Fig. 5 is a partial sectional view taken on line 5—5 of Fig. 4.

Referring now to the drawings, wherein like reference numerals designate like or corresponding parts throughout the several views, there is shown in Fig. 1 a typical installation of the missile dispenser mechanism 10 in an aircraft 11 wherein the dispensing mechanism 10 is sup- Fig. 2 shows numerous details of the missile dispenser mechanism or projector including a main supporting frame or plate 21 provided with a plurality of upstanding lugs 22 to which suitable supporting structures such as the links 12 and the actuating means 13 may be pivotally connected. The dispenser mechanism drive motor 24 is fixedly secured centrally of the plate 21 and operatively connected to the downwardly projecting shaft 25. Said shaft is fitted at its lower end with the supporting means 26 arranged to support the rotatable missile container assembly 28 in fixed relation to said shaft 25 for rotation therewith. The missile container 28 is generally cylindrical in shape and includes a circular outer wall provided with a large plurality of circular openings therethrough spaced at equal intervals along its lower edge. These circular openings 31 are shown both in Fig. 1 and Fig. 2. The rotatable missile container 28 is divided into a plurality of radially extending compartments by vertically disposed partitions 29 arranged as shown best in Fig. 3 to retain a large plurality of missiles 32 in vertical stacks with the bottom missile in each stack disposed in alignment with a circular opening 31. The missile container 28 also includes a centrally disposed housing 41 for a plurality of remotely controlled actuating mechanisms shown best in Fig. 4 and described below in relation thereto. The lower end of the housing 41 designated by the reference numeral 42 is provided with a plurality of vertically elongated openings 43 spaced about its outer periphery through which a plurality of radially disposed latch means 44 project for engagement with the lowermost missile 32 in each of the respective stacks thereof.

Turning next to a discussion of means for releasing missiles from the missile dispenser mechanism and control means therefore, the showing in Fig. 2 includes a schematic representation of a remotely located control panel 34 accessible to an operator within the aircraft 11 and connected by means of conduit 35 to the missile dispenser assembly 10. The control panel 34 may conveniently include a series of push buttons 38 each arranged to release a single missile or a small plurality thereof and a single push button 39 for releasing a missile from each of the openings 31 simultaneously. With this arrangement, considerable flexibility in the distribution of missiles may readily be obtained. The diagrammatic showing in Fig. 4 includes representations of a plurality of push buttons 38 and a representation of the "all" push button 39 with the associated circuitry including the slip ring arrangement for interconnecting portions of the circuitry within the relatively fixed and the relatively moveable elements of the missile dispenser mechanism, respectively. In addition, Fig. 4 includes a schematic representation of a representative missile release mechanism including a solenoid 51, the solenoid armature 52 and a connector 53 attached to the end of the armature 52 and arranged to engage the latch means 44. The elongated latch means 44 is attached by means of a pivotal connection 55 to a suitable supporting means 56 and normally biased upwardly by the spring 57 to bring the sear portion 45 of the latch means 44 into engagement with an adjoining missile 32.

The showing in Fig. 5 of a portion of the slip rings and their associated contacts 62 is intended to supplement the showing of these parts in Fig. 4. With this arrangement, an operative relation between the control panel 34 and the respective solenoids 51 can be continuously maintained. However, if it proves desirable to restrict the azimuths on which the missiles can be fired, for example, to preclude discharging missiles ahead of the aircraft, an angular portion of the slip rings may be replaced with insulating material, as shown in Fig. 5.

Prior to takeoff of the aircraft 11, the missile dispenser mechanism 10 may be lowered below the aircraft by operation of actuating means 13 in order to facilitate loading the missile container 28 with missiles 32. The loading operation may be facilitated by providing a suitable access opening in the plate 21 so that each of the compartments defined by the partitions 29 may be completely filled with missiles 32. Thereafter the missile dispenser mechanism 10 is retracted within the bomb bay 14 of the aircraft 11 for takeoff and flight to a point near the target area. At this point the bomb bay is opened and the missile dispenser mechanism is lowered beneath the aircraft by operation of the actuating means 13. When the dispenser 10 has reached its fully extended position the drive motor 24 may be energized by operation of the switch 36 on the control panel 34 in order to produce rapid rotation of the missile container 28. This rotation of the missile container 28 produces a substantial centrifugal force imposed upon all of the missiles 32 contained therein. Hence, each missile released under such conditions from the missile container will travel a substantial distance laterally away from the missile dispenser mechanism before it reaches the target area on the ground beneath the aircraft 11. The lateral distance the missiles will travel can conveniently be regulated by adjusting the speed of rotation of the drive motor 24 to produce a corresponding variation in the centrifugal force exerted upon the missiles. This speed adjustment can be accomplished by adjusting a suitable speed control 37. With the arrangement shown in Fig. 2 all of the missiles except the lowest one in each stack are continuously restrained by the peripheral outer wall of the container 28 against responding to the centrifugal force exerted thereon. Since the lowermost missile in each stack is in alignment with an opening 31 through the peripheral outer wall of container 28 each of these missiles must be restrained against the effect of centrifugal force by means of a suitable latch means 44. With this arrangement, all of the missiles are retained in the container until one or more are released at the option of the operator by actuation of the appropriate push buttons. Referring now to Fig. 4, when a push button designated by the reference numeral 38 is pressed, the circuit controlled thereby is closed and the solenoid 51 is energized to drive the armature 52 downwardly. Since the armature 52 is connected to the latch means 44 by means of a connector 53, downward movement of the armature 52 overcomes the biasing means 57 to produce downward deflection of the latch means 44 to move the sear portion 45 out of engagement with the adjacent missile 32. Relieved of restraint, the missile 32 is discharged through the opening 31 under the influence of substantial centrifugal force so that it travels a considerable distance laterally before it strikes a target. If a push button 38 is released immediately after it is depressed, the latch means 44 will again be biased into its normal position by the spring 57 to engage the next missile as it drops into the lowermost position in the stack. This next missile may then be released by the operator in the same manner by again depressing the same push button 38. On the other hand, if the push button is not released immediately, the solenoid will remain energized and the latch means 44 will remain in its downwardly depressed position so that as each successive missile is dropped into the lowermost position in the stack it will in turn be discharged through the opening 31 under the influence of the centrifugal force applied thereto. Thus, a salvo of missiles may be fired through any opening by continuously depressing the push button controlling that opening.

In practice, each push button 38 will preferably be operatively connected to one or more pairs of diametrically opposed solenoids 51, so that the weight distribution will remain symmetrical about the axis of rotation of the container 28 regardless of the manner in which the respective push buttons 38 are actuated. Moreover, if the downward movement of missiles within the respective stacks is not reliably effected by gravitational force alone due to friction induced by the high centrifugal force imposed, this downward movement can be assured by the provision of suitable downwardly directed biasing means acting on the missiles in each stack. In addition, the inside surface of the peripheral outer wall of the container 28 may be sloped outwardly toward the bottom to facilitate the downward movement of the missiles in each stack.

Operation of the push button 39 is similar to that of any of the push buttons 38 with the exception that actuation of the push button 39 results in simultaneous energization of all of the solenoids 51 with the result that all of the latch means 44 are depressed simultaneously to release one or more missiles from all the openings 31.

The present invention discloses a device intended primarily for use with relatively compact missiles such as incendiary bombs. However, the shape and size of the missile dispenser mechanism may be modified to accommodate other types of missiles and may also be enlarged where space permits to accommodate increased quantities thereof. In fact, the missile dispenser mechanism herein described may be made adaptable to receive several different types of missiles alternatively depending upon the mission for which it is to be used.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for attachment to an aircraft comprising a centrifugal missile dispenser mechanism, said mechanism including a relatively fixed supporting frame, a container in which a plurality of missiles may be releaseably contained, supporting means arranged to support said container rotatably beneath said frame, driving means mounted upon said frame and operatively connected to said supporting means to produce rotation of said container and thereby generate substantial centrifugal force, a plurality of individual restraining means disposed within said container and arranged to restrain a corresponding plurality of missiles against discharge from said container in response to the centrifugal force applied thereto, and a remotely disposed control means operatively connected to said driving means and to said restraining means, arranged to selectively energize and de-energize said driving means and including first means for releasing said restraining means in sequential order and second means for releasing said restraining means simultaneously, selectively operable to discharge a plurality of missiles from said container by means of the centrifugal force applied thereto, either in sequential order by actuation of said first means or simultaneously by actuation of said second means.

2. Apparatus for attachment to an aircraft comprising a centrifugal missile dispenser mechanism, said mechanism including a relatively fixed supporting frame, a container in which a plurality of missiles may be releaseably contained, supporting means arranged to support said container rotatably beneath said frame, driving means mounted upon said frame and operatively connected to said supporting means to produce rotation of said container and thereby generate substantial centrifugal force, a plurality of individual restraining means disposed within said container and arranged to restrain a corresponding plurality of missiles against discharge from said container in response to the centrifugal force applied thereto, a remotely disposed control means operatively connected to said driving means and to said restraining means, arranged to selectively energize and de-energize said driving means and including first means for releasing said restraining means in sequential order and second means for releasing said restraining means simultaneously, selectively operable to discharge a plurality of missiles from said container by means of the centrifugal force applied thereto, either in sequential order by actuation of said first means or simultaneously by actuation of said second means, and a retractable linkage interconnecting said dispenser mechanism and an aircraft operable to move the missile dispenser between a retracted position within an aircraft and an extended position beneath an aircraft.

3. Apparatus for attachment to an aircraft comprising a centrifugal missile dispenser mechanism, said mechanism including a relatively fixed supporting frame, a container in which a plurality of missiles may be releasably contained, supporting means arranged to support said container rotatably beneath said frame, driving means mounted upon said frame and operatively connected to said supporting means to produce rotation of said container, and thereby generate substantial centrifugal force, a plurality of individual restraining means disposed within said container and arranged to restrain a corresponding plurality of missiles against discharge from said container in response to the centrifugal force applied thereto, each said restraining means including an elongated latch means disposed radially relative to said supporting means, a support member disposed adjacent the radially inner end of said latch means, a pivotal connection arranged to pivotally interconnect the radially inner end of said latch means and said support member, a sear portion projecting laterally from the radially outer end of said latch means for engagement with an adjacent missile, a biasing means disposed adjacent said latch means and arranged to bias said latch means upwardly to force said sear portion into engagement with a missile in order to restrain said missile against discharge from said container, a solenoid disposed adjacent an intermediate portion of said latch means, an armature connected at one end to said latch means and disposed at the other end in operative relation to said solenoid, whereby energization of said solenoid produces downward displacement of said armature and the latch means to which it is connected to disengage the latch means from an adjacent missile so that the missile is discharged from said container, said container comprising a generally cylindrical housing having a plurality of circular openings therethrough spaced about the lower edge of its outer periphery and provided with a plurality of pairs of generally radially disposed vertical partitions arranged to support stacks of horizontally disposed elongated missiles so that the lowermost missile in each stack is disposed adjacent to one of aid restraining means and in alignment with one of the openings through the outer periphery of said housing, a remotely disposed control means operatively connected to said driving means and to said restraining means, arranged to selectively energize and de-energize said driving means and effective to displace said restraining means selectively in order to discharge a plurality of missiles from said container either in sequential order or simultaneously by means of the centrifugal force applied thereto, and a retractable linkage interconnecting said dispenser mechanism and an aircraft operable to move the missile dispenser between a retracted position within an aircraft and an extended position beneath an aircraft.

4. Apparatus for attachment to an aircraft comprising a centrifugal missile dispenser mechanism, said mechanism including a relatively fixed supporting frame; a container in which a plurality of missiles may be releasably contained; supporting means arranged to support said container rotatably beneath said frame; driving means mounted upon said frame and operatively connected to said supporting means to produce rotation of said container and thereby generate substantial centrifugal force; a plurality of individual restraining means disposed within said container and arranged to restrain a corresponding plurality of missiles against discharge from said container in response to the centrifugal force applied thereto, each said restraining means including an elongated latch means disposed radially relative to said supporting means, a support member disposed adjacent the radially inner end of said latch means, a pivotal connection arranged to pivotally interconnect the radially inner end of said latch means and said support member, a sear portion projecting laterally from the radially outer end of said latch means for engagement with an adjacent missile, a biasing means disposed adjacent said latch means and arranged to bias said latch means upwardly to force said sear portion into engagement with a missile in order to restrain said missile against discharge from said container, a solenoid disposed adjacent an intermediate portion of said latch means operable in opposition to said biasing means to downwardly displace said latch means, and an armature connected at one end to said latch means and disposed at the other end in operative realtion to said solenoid; and a remotely disposed control means operatively connected to said driving means and to said restraining means, arranged to selectively energize and de-energize said driving means and effective to displace the respective restraining means selectively by energization of the solenoid thereof in order to discharge a plurailty of missiles from said container by means of the centrifugal force applied thereto, either in sequential order or simultaneously.

References Cited in the file of this patent

UNITED STATES PATENTS

| 1,400,261 | Bowker | Dec. 13, 1921 |
| 1,636,451 | Andrus | July 19, 1927 |
| 2,646,786 | Robertson | July 28, 1953 |

FOREIGN PATENTS

| 102,843 | Great Britain | Jan. 4, 1917 |
| 109,327 | Great Britain | Sept. 13, 1917 |
| 912,529 | France | Apr. 29, 1946 |